July 4, 1950 W. C. MEINERDING 2,514,348
DOUGHNUT HANDLING AND TURNING APPARATUS
Filed Jan. 19, 1948 2 Sheets-Sheet 1

INVENTOR.
Wesley C. Meinerding
BY
ATTORNEYS

July 4, 1950     W. C. MEINERDING     2,514,348
DOUGHNUT HANDLING AND TURNING APPARATUS Filed Jan. 19, 1948     2 Sheets-Sheet 2

INVENTOR.
Wesley C. Meinerding
BY
Frease and Bishop
ATTORNEYS

Patented July 4, 1950

2,514,348

UNITED STATES PATENT OFFICE 2,514,348

DOUGHNUT HANDLING AND TURNING APPARATUS

Wesley C. Meinerding, Canton, Ohio

Application January 19, 1948, Serial No. 2,978

6 Claims. (Cl. 99—409)

The invention relates generally to apparatus for cooking doughnuts of risen dough, and more particularly to an apparatus for immersing and turning a plurality of doughnuts in hot fat and removing and dumping the cooked doughnuts.

Automatic machines have been provided for continuously producing doughnuts from cake mixes, and such machines include means for extruding the mix or batter through a die ring and then cooking the doughnuts in deep melted fat. Risen doughnuts can not be made in such machines because the risen dough is not adapted for successful extrusion, and the preparation of the rings of risen dough is necessarily a separate operation, called "proofing."

When the rings of risen dough are ready or "proofed" they are placed in a vat or kettle of melted fat on which they float during the cooking and therefore must be turned completely over to cook the other side. This turning operation was originally done by using a stick to turn the floating doughnuts one by one, but such an operation required excessive time.

Certain prior apparatus includes a frame having a screen or pallet for supporting a plurality of the risen doughnuts while lowering them into and removing them from the cooking fat, with means carried on the frame for turning the doughnuts while they float on the fat. However, the screen or pallet carrying the cooked doughnuts must be removed from the frame, then unloaded and then reloaded with uncooked doughnuts.

It has been proposed to provide apparatus for making risen doughnuts in which the cooking and turning operations are more or less automatic, but the result has been machinery which is usually too complicated and expensive to justify its use.

It is an object of the present invention to provide a novel and improved apparatus for handling risen doughnuts efficiently from the time they are cut until they are completely cooked and unloaded from the cooking frame.

Another and more specific object is to provide a novel frame having tiltable trays for supporting the doughnuts and for turning them during cooking.

Another object is to provide a frame having a second set of tiltable trays for supporting turned doughnuts after cooking and then dumping said doughnuts.

A further object is to provide a novel frame having a set of upper tiltable trays for supporting uncooked doughnuts and a set of lower tiltable trays for receiving turned doughnuts from the upper trays and for dumping cooked doughnuts.

Another object is to provide means for simultaneously tilting the upper trays and means for simultaneously tilting the lower trays.

A still further object is to provide proofing trays adapted for cooperating with the upper tilting trays for loading the uncooked risen doughnuts onto the upper tilting trays in proper position.

Finally, it is an object of the present invention to provide a novel and improved apparatus for handling risen doughnuts during loading, cooking and unloading, which apparatus is simple, lightweight and inexpensive in construction, and efficient and time-saving in use.

These and other objects are accomplished by the parts, improvements, constructions, arrangements and combinations comprising the present invention, the nature of which is set forth in the following general statement, and a preferred embodiment of which is described in the following specification and illustrated in the accompanying drawings, and which is particularly and distinctly pointed out and set forth in the appended claims forming part hereof.

In general terms the novel apparatus comprising the present invention may be stated as including a series of simultaneously tiltable upper trays arranged side-by-side for supporting rows of doughnuts, each tray being pivoted at its ends in a frame for turning the doughnuts, a series of simultaneously tiltable lower trays each arranged to receive turned doughnuts from the laterally adjacent upper tray when tilted, said lower trays being pivoted at their ends in the frame for dumping the turned doughnuts below the frame, and a plurality of detached loading trays for supporting rows of doughnuts during proofing, each loading tray being constructed to cooperate with any of said upper trays for loading a row of doughnuts into said upper tray.

Referring to the drawings forming part hereof, in which a preferred embodiment of the invention is shown by way of example;

Similar numerals refer to similar parts throughout the drawings.

Figure 1:
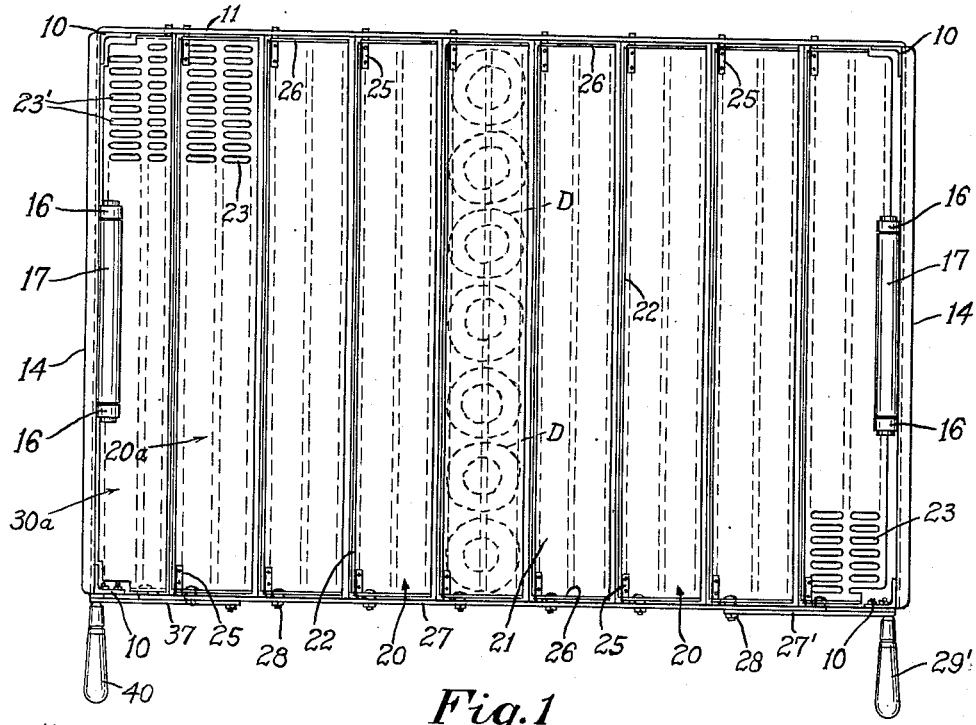
Figure 1 is a plan elevational view of the improved frame carrying the rows of tiltable trays.

The novel handling and turning apparatus of the present invention preferably includes a rectangular frame having four corner angle legs 10 with side bars 11 secured at their ends to intermediate portions of the corner legs as by screws or rivets. Preferably end bars 12 are connected at their ends to intermediate portions of the legs 10 and extend across the ends of the frame from the ends of the side bars 11.

As shown in Figs. 2-6, a second pair of side bars 13 may be provided, being connected at their ends to the bottom ends of the legs 10 for stiffening the frame. The upper ends of the angle legs 10 are preferably connected by end angle bars 14 extending parallel to end bars 12 for providing lateral stiffness to the frame, and handle brackets 15 are mounted at their lower ends on the bars 14, being provided with loops 16 at their upper ends in which cylindrical handle bars 17 are mounted centrally of the ends of the frame.

As indicated in the drawings, the legs 10 and the bars 11, 12, 13 and 14 are preferably perforated, being provided with one or more series of closely spaced holes such as 18 for reducing the weight of the various frame members, and the weight may be further reduced by using metal which is light in weight, such as aluminum alloy.

A series of doughnut supporting and turning trays indicated generally at 20 are preferably mounted in side-by-side relation in the frame and extend laterally thereof between the side bars 11. Preferably these trays 20 are L-shaped in cross section having a bottom wall 21 and a side wall 22, and the walls 21 and 22 are preferably provided with perforations, which may be closely spaced series of slots 23 and 24 respectively. These slots not only reduce the weight of the trays, but allow the hot grease in which the doughnuts are cooked to pass readily therethrough in all positions of the trays. The trays 20 are preferably pivoted at their ends in the opposite side bars 11, and this may be accomplished by securing pivot pins 25 in the corners of the trays at the ends thereof, with the outer ends of the pins journaled in the side bars 11. Thus the trays 20 are tiltable about the pivots 25 from the horizontal position of the trays such as shown in Fig. 4, upwardly to their vertical position shown in Figs. 5 and 6.

Each of the trays is preferably provided with end walls 26 through which the pivot pins 25 pass, and the means for tilting all of the trays 20 simultaneously preferably includes an operating bar 27 located slightly above one of the side bars 11 and pivoted to the adjacent end walls 26 of all the trays 20 by pivots indicated at 28. The bar 27 may be perforated if desired, and is preferably smaller in size than the side bars 11. The means for actuating the bar 27 preferably includes a link 27' pivoted at one end to one of the pivots 28 of the operating bar, and pivoted at its other end to an intermediate portion of a handle lever 29, which is in turn pivoted at its lower end to one of the legs 10 and which has a hand grip 29' at its upper end.

Figure 4:
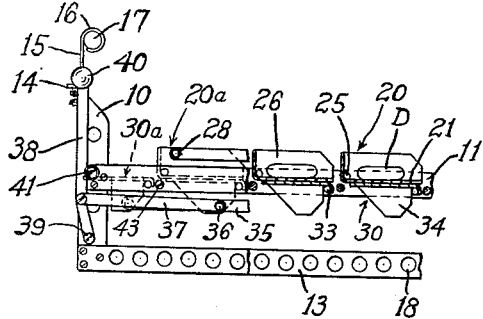
Fig. 4 is a fragmentary side elevation, partly in section, showing the trays in position for supporting uncooked doughnuts on the upper trays.
Figure 5:
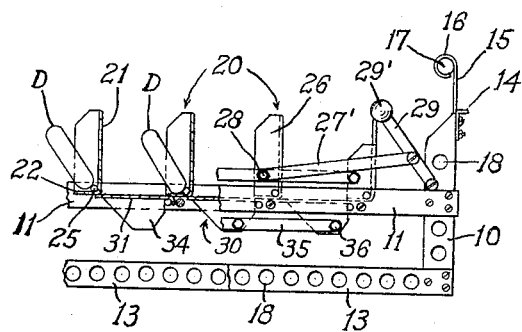
Fig. 5 is a fragmentary side elevation, partly in section, showing the upper trays tilted to turn the doughnuts carried thereon, with the lower trays in position to receive the turned doughnuts.

Accordingly, when the handle 29 is moved from the position of Fig. 4 to the position of Fig. 5, the trays 20 are simultaneously tilted upwardly from a horizontal position in which they support the doughnut rings D to a vertical position in which they flop over or turn the doughnut rings D. The trays 20 are spaced apart only a sufficient distance so that when they are tilted the lower right corner of one tray will just pass the upper left corner of the adjacent tray, and this spacing brings the trays close enough together in the position of Fig. 4 so that the side wall 22 of one tray acts as the opposite side wall for the adjacent tray, thus forming a trough or channel for a row of doughnut rings D.

Figure 8:
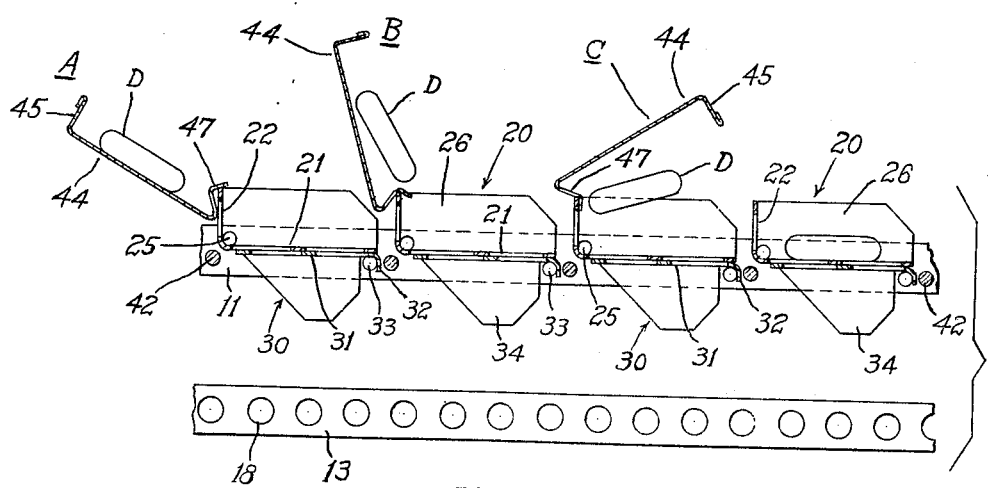
Fig. 8 is an enlarged fragmentary sectional view showing the manner in which the loading tray of Fig. 7 cooperates with one of the upper tilting trays to load a row of doughnuts thereon.

A lower series of dumping trays indicated generally at 30 is provided for receiving the doughnuts as they are turned from the upper trays 20, as indicated in Fig. 5. Preferably the lower trays 30 are positioned so that their horizontal walls 31 closely underlie the horizontal walls 21 of the upper trays, when both trays are in horizontal position as shown in Figs. 4 and 8. The horizontal walls 31 preferably have series of closely spaced slots 23' therein. The trays may have short side walls 32 with pivot pins 33 in the corners of the trays at their ends for pivoting the trays 30 in the side bars 11. The trays 30 preferably have end walls 34, and at one side of the frame, an operating bar 35 is pivotally connected below the side bar 11 to all the adjacent end walls 34 by pivots 36, for causing all the trays 30 to tilt downwardly simultaneously about the pivots 33. The bar 35 may be substantially equal in dimensions to the bar 27 and may be perforated if desired.

The means for actuating the operating bar 35 preferably includes a link 37 connected at one end to one of the pivots 36 and pivoted at its other end to an intermediate portion of a handle lever 38. The handle lever 38 is pivoted at its lower end 39 to the adjacent leg 10 and has a hand grip 40 at its upper end. As shown, the handle lever 38 is mounted on the same side of the frame as the handle lever 29, but at the opposite end thereof.

Figure 6:
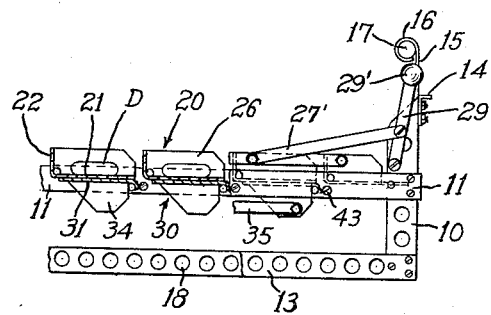
Fig. 6 is a fragmentary side elevation, partly in section, showing the lower trays in tilted position to dump the cooked doughnuts.
Figure 6:
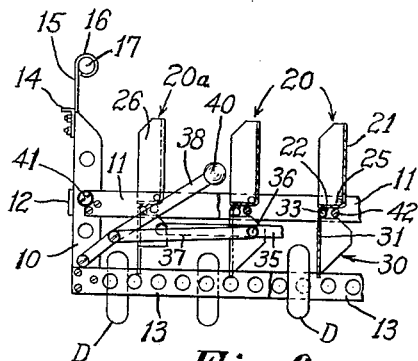

Accordingly, when the operating lever 38 is moved clockwise from the position shown in Fig. 4 to the position shown in Fig. 6, the lower trays 30 are simultaneously tilted downwardly about the pivots 33 for dumping the doughnuts D carried by the lower trays. Means for locking the handle lever 38 in the upright position of Fig. 4 wherein the lower trays are horizontal, preferably includes a retaining washer or catch 41 projecting beyond the adjacent end of bar 11, behind which the lever 38 may be engaged, the pivot 39 being loose enough to permit the handle lever to be swung outwardly and moved in front of the bar 11 when desired, to the position of Fig. 6.

Figure 2:
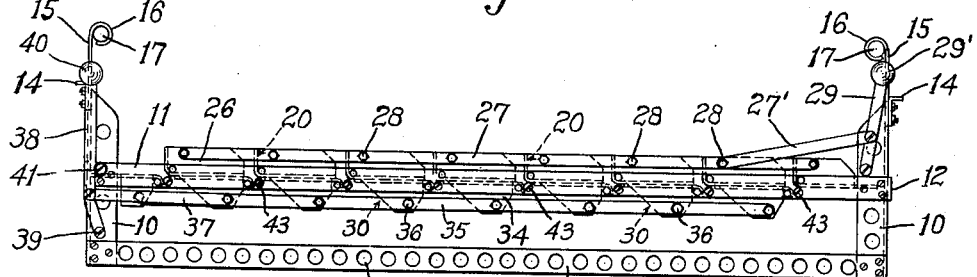
Fig. 2 is a side elevation thereof.
Figures 3, 7:
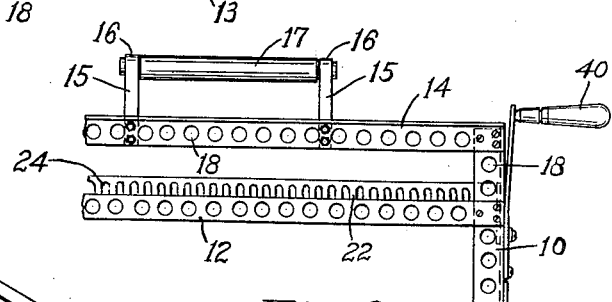
Fig. 3 is a fragmentary end elevation thereof.
Fig. 7 is a detached perspective view of one of the loading trays adapted to support a row of uncooked doughnuts during proofing.

As best shown in Fig. 8, a series of tie rods 42 extend transversely of the frame between the side bars 11, for stiffening the frame between the trays. These tie rods 42 may be connected to the side bars by suitable screws 43 or the like (Figs. 2 and 4).

As viewed in Figs. 4, 5 and 6, the doughnuts D which are carried on the trays 20 are flopped over or turned to the left when the trays 20 are tilted upwardly as shown in Fig. 5, the doughnuts being supported on the side walls 22 as the trays are raised. Accordingly, there is a lower tray 30 positioned adjacent and to the left of each tray 20 for receiving the doughnuts as they are turned, so that there is one lower tray 30a to the left of the upper tray 20a at the extreme left of the row, and there is no lower tray under the upper tray 20 at the extreme right of the row.

In the operation of the novel handling and turning apparatus the risen doughnut rings, after being proofed, are placed in rows on the upper trays 20 as indicated at D in Figs. 1 and 4. When all of the trays 20 are thus loaded, the frame is grasped by the handles 17 and lowered into a vat containing hot fat, the vat being equipped with suitable inner projections for supporting the frame at a position wherein the grease level is slightly above the bottom walls 21 of the trays 20. The doughnut rings D immediately rise slightly to float on the hot fat and their undersides are rapidly cooked, the side walls 22 providing channels for retaining the doughnuts in position.

As soon as the undersides have cooked sufficiently, the operator quickly moves the handle lever 29 in a counterclockwise direction to tilt the trays 20 upwardly to the position of Fig. 5, and the momentum of the half cooked doughnuts D flops them over or turns them onto the horizontal walls 31 of the lower trays, or onto the fat level slightly above the same, the now vertical walls 21 providing channels for retaining the doughnuts in position. As soon as the cooking of the doughnuts is completed, the operator grasps the handles 17 and withdraws the frame from the fat.

The frame full of cooked doughnuts is then carried to a place for dumping the same, which in the case of making glazed doughnuts may be a vat containing the liquid glaze. The operator then releases the handle lever 38 from behind the catch 41 and moves the handle lever clockwise to the position of Fig. 6, which simultaneously tilts all the trays 30 downwardly and dumps all the doughnuts D carried thereby, below the frame. As indicated in Figs. 5 and 6, the trays 20 are left in vertical position while the doughnuts are cooked on the other side and until they are dumped.

In order to facilitate the loading of the proofed doughnut rings onto the trays 20, a plurality of loading trays 44 are provided. These loading trays are formed of thin light weight sheet metal, and have a vertical side flange 45, a bottom wall 46 and an angular side wall 47. Preferably the bottom wall projects outwardly at one end forming a hand grip portion 48. When the doughnut rings of risen dough are cut they are deposited in rows on the trays 44 and allowed to stand for a suitable length of time for proofing. When the doughnut rings are ready to be cooked, the operator picks up a tray 44 and engages the groove of the angular wall 47 over the top edge of the side wall 22 of one of the trays 20 as shown in the position A in Fig. 8. The loading tray 44 is then rocked to the right while pivoting on the top edge of the wall 22 through the position indicated at B to the position indicated at C, which dumps the whole row of doughnut rings D from the loading tray into the turning tray 20 immediately below the same. Then other loading trays are dumped into the other trays 20 until they are all loaded.

Accordingly, by using the loading trays 44 in cooperation with the turning trays 20 of the novel handling and turning apparatus, the doughnuts are not handled or touched by the hands of the operator from the cutting operation until after they are dumped from the lower trays 30. Obviously, a large number of doughnuts can be proofed, cooked, turned, and dumped in a most efficient manner by using the novel apparatus, and the apparatus is simple, light weight and inexpensive, while saving time and promoting efficiency in use.

In the foregoing description, certain terms have been used for brevity, clearness and understanding; but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. Doughnut handling and turning apparatus including a rectangular frame, a series of upper trays mounted in side-by-side relation in said frame for supporting rows of doughnuts, means pivoting the ends of each upper tray on said frame for tilting movement, an operating bar connecting all of said upper trays for simultaneously turning all doughnuts carried thereon, a series of lower trays each arranged to receive turned doughnuts from the laterally adjacent upper tray when it is tilted, means pivoting the ends of each lower tray on said frame for dumping turned doughnuts below said frame, and an operating bar connecting all of said lower trays for simultaneously dumping the same.

2. Doughnut handling and turning apparatus including a rectangular frame, a series of upper trays mounted in side-by-side relation in said frame for supporting rows of doughnuts, said upper trays being L-shaped in cross section with the closed side of each tray toward the open side of the adjacent tray, means pivoting the ends of each upper tray on said frame for tilting movement, an operating bar connecting all of said upper trays for simultaneously turning all doughnuts carried thereon, a series of lower trays each arranged to receive turned doughnuts from the laterally adjacent upper tray when it is tilted, means pivoting the ends of each lower tray on said frame for dumping turned doughnuts below said frame, and an operating bar connecting all of said lower trays for simultaneously dumping the same.

3. Doughnut handling and turning apparatus including a rectangular frame, a series of upper perforate trays mounted in side-by-side relation in said frame for supporting rows of doughnuts, said upper trays being L-shaped in cross section with the closed side of each tray toward the open side of the adjacent tray, means pivoting the ends of each upper tray at the corners thereof on said frame at positions permitting simultaneous tilting of all said trays with close clearance, means operatively connecting said upper trays for simultaneously tilting the same to turn the doughnuts carried thereon, a series of lower perforate trays each arranged to receive turned doughnuts from the laterally adjacent upper tray when it is tilted, means pivoting the ends of each lower tray on said frame for dumping turned doughnuts from the trays, and means operatively connecting said lower trays for simultaneously dumping the same.

4. Doughnut handling and turning apparatus including a rectangular frame, a series of perforate turning trays mounted in side-by-side relation in said frame for supporting rows of doughnuts said turning trays being L-shaped in cross section with the closed side of each tray toward the open side of the adjacent tray, means pivoting the ends of each said tray in said frame for tilting movement, means for upwardly tilting all of said trays simultaneously, a series of perforate dumping trays each dumping tray laterally adjacent to one of said turning trays, means pivoting the ends of each dumping tray in said frame for tilting movement, and separate means for downwardly tilting all of said dumping trays simultaneously.

5. Doughnut handling and turning apparatus including a rectangular frame, a series of perforate turning trays mounted in side-by-side relation in said frame for supporting rows of doughnuts, means pivoting the ends of each said tray in said frame for upward tilting movement, an operating bar pivotally connected to all of the turning trays, a handle lever pivoted on one end of the frame and operatively connected to said operating bar for tilting all of said turning trays simultaneously, a series of perforate dumping trays each dumping tray laterally adjacent to one of said turning trays means pivoting the ends of each dumping tray in said frame for downward tilting movement, an operating bar pivotally connected to all of said dumping trays, and a handle lever operatively connected to said dumping tray operating bar for downwardly tilting all said dumping trays simultaneously, said dumping tray handle lever being pivotally mounted on the opposite end of the frame from the turning tray handle lever.

6. Doughnut handling and turning apparatus including a rectangular frame, a series of perforate turning trays mounted in side-by-side relation in said frame for supporting rows of doughnuts, said turning trays being L-shaped in cross section with the closed side of each tray toward the open side of the adjacent tray, means pivoting the ends of each said tray in said frame for upward tilting movement, an operating bar pivotally connected to all of the turning trays, a handle lever pivoted on one end of the frame and operatively connected to said operating bar for tilting all of said turning trays simultaneously, a series of perforate dumping trays each dumping tray laterally adjacent to one of said turning trays, means pivoting the ends of each dumping tray in said frame for downward tilting movement, an operating bar pivotally connected to all of said dumping trays, and a handle lever operatively connected to said dumping tray operating bar for downwardly tilting all said dumping trays simultaneously, said dumping tray handle lever being pivotally mounted on the opposite end of the frame from the turning tray handle lever.

WESLEY C. MEINERDING.

REFERENCES CITED

The following references are of record in the file of this patent:

UNITED STATES PATENTS

| Number | Name | Date |
|---|---|---|
| 980,246 | Graham | Jan. 3, 1911 |
| 2,202,602 | Ruch | May 28, 1940 |
| 2,189,200 | Dusterdick | Feb. 6, 1940 |